(No Model.) 2 Sheets—Sheet 1.

W. G. BOUSE.
ICE VELOCIPEDE.

No. 504,265. Patented Aug. 29, 1893.

Witnesses
Adolph Gorge
Jos. J. David

Inventor
William G. Bouse
by
William N. Monroe
Attorney (No Model.) 2 Sheets—Sheet 2.
W. G. BOUSE.
ICE VELOCIPEDE.
No. 504,265. Patented Aug. 29, 1893.
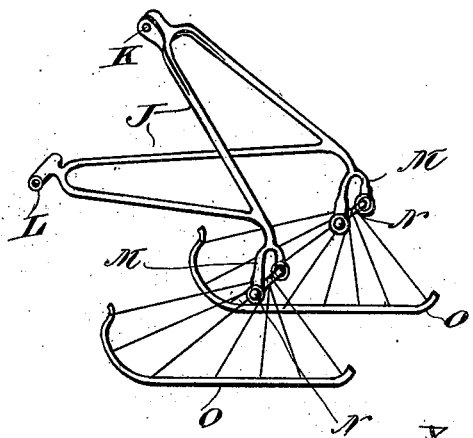
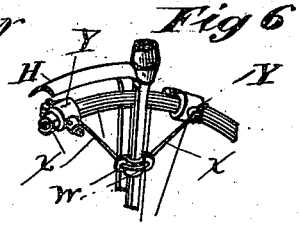
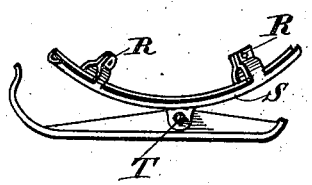
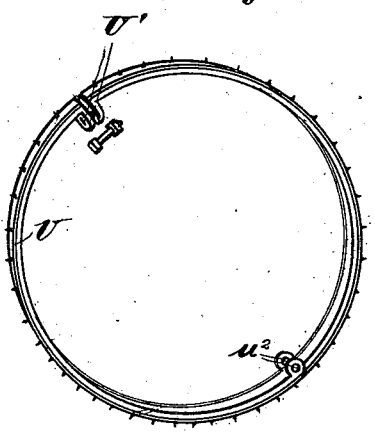
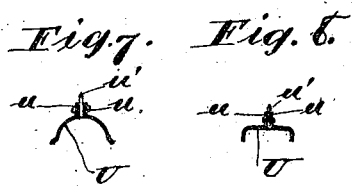
Witnesses
Adolph Gorge
Jos. J. Davis
Inventor
William G. Bouse
by William M. Monroe,
Attorney.

UNITED STATES PATENT OFFICE.

WILLIAM G. BOUSE, OF LORAIN, OHIO.

ICE-VELOCIPEDE.

SPECIFICATION forming part of Letters Patent No. 504,265, dated August 29, 1893.

Application filed February 18, 1893. Serial No. 462,888. (No model.)

*To all whom it may concern:*

Be it known that I, WILLIAM G. BOUSE, a citizen of the United States, and a resident of Lorain, county of Lorain, State of Ohio, have invented certain new and useful Improvements in Sleds, of which I hereby declare the following to be a full, clear, and exact description, such as will enable others skilled in the art to which it appertains to make and use the same.

My invention relates to improvements in bicycles and its object is to provide a form of bicycle adapted to combine with runners, for use on snow or ice and it consists in the form of wheel and the attachments thereto with the manner of arrangement and combination of parts with the construction of details as hereinafter described, shown in the accompanying drawings and more specifically pointed out in the claims.

Figure 1:
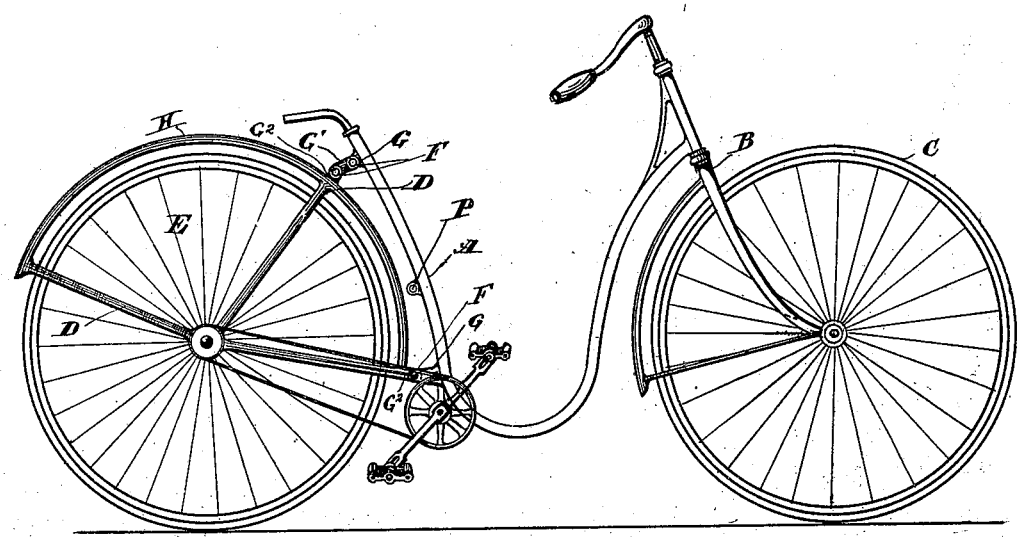
Figure 2:
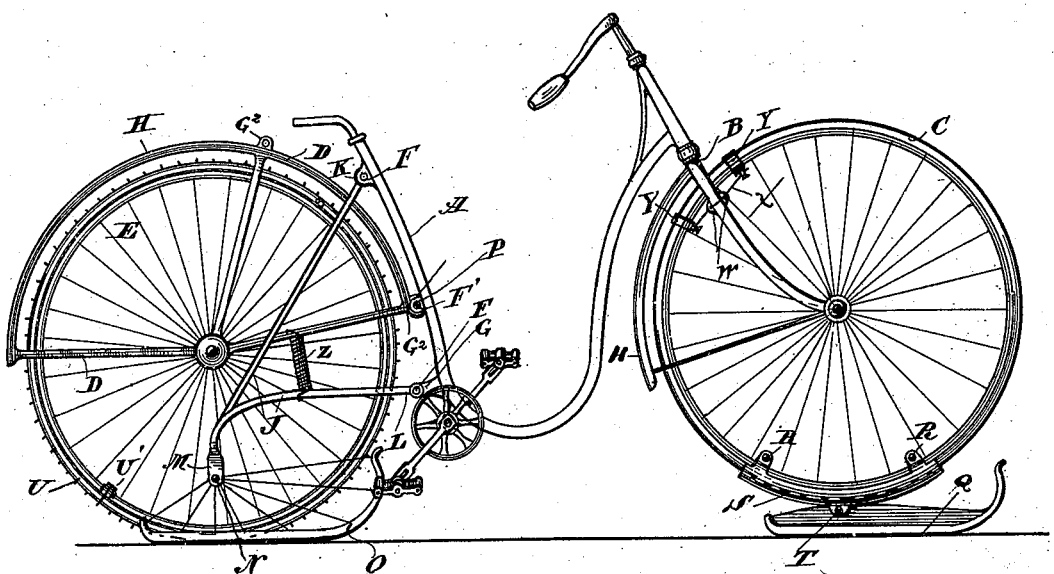

In the accompanying drawings Figure 1 is a view of the bicycle without attachments. Fig. 2 is a view of the complete device. Fig. 3 is a view of the detached frame. Fig. 4 is a view of special tire. Fig. 5 is a view of front runner. Fig. 6 is a view of clamp for front wheel. Figs. 7 and 8 are views of the tire in section.

In the figures A is the bicycle frame to which is pivoted the front fork B for the wheel C, as usual.

D is the supporting frame, for the hind wheel E secured to the main frame detachably by bolts or pins F, passing through eyes G, with link G' at the upper point of attachment. Eyes $G^2$ on the wheel frame correspond thereto.

The form of the bicycle frame is such that the wheel can be ridden by either men or women being low in the center.

H is a mud guard.

When it is desired to employ the runners, the hind wheel E and supporting frame D are removed from the eyes G, and the forked frame J substituted therefor, the extremities K and L, being placed in the eyes G, as seen in the complete figure, (Fig. 2.) The forked frame J is seen to be provided with lower forked extremities M, in which are inserted the pivots N to which the runners O are secured. The wheel frame D and mud guard H are then pivotally attached at P to the main frame, the effect of which is to give a free vertical swing to the wheel, which is connected in the usual manner to the chain gearing, and is provided with an especial form of exterior tire to enable it to be used as a driving wheel. In the mean time the front wheel has been rigidly set by means of the brake or the mechanism shown in the figures, so that it cannot turn and a runner Q attached thereto by means of clamps R and curved bar S, to which the runner is pivoted at T.

As will be seen from the drawings the forked support for the hind wheel is secured at only two points, the same points of attachment being employed for the forked frame of the runners which is adapted to straddle the hind wheel and permit the free vertical movement requisite when traveling over rough ground.

The tire employed in propelling the wheel is detachable and consists in the hoop U of semi-circular section clamped as seen at U' by suitable bolts, or other means, while the periphery is studded with sharpened projections $u'$ or points adapted to engage the ice in passing. It will be readily seen that tires of this character can be quickly attached to both wheels over the rubber tire and may even be made large enough to be clamped over the pneumatic tire if desired.

The clamping device for the front wheel is seen to consist in the simple eyes W, and wires X with clamps Y.

The advantages of this device are obvious in its adaptation to a bicycle for general use, at that season of the year when the usual form could not be employed. A spring Z may be employed to secure prompt action and engagement of the traction wheel. The lower eye G, may be coincident with the pedal center and the pedal shaft may be employed as the point of attachment.

The driving tire is shown in Figs. 7 and 8, in section and as shown consists in equal sections riveted or otherwise secured together through the flanges, $u$.

$u'$ are the projections pointed at their outer extremities and secured between the flanges $u$.

$u^2$ is the hinge.

In Figs. 7 and 8 two forms are shown one adapted to a rubber tire and the other adapted to an iron tire.

Having described my invention, what I claim as new, and desire to secure by Letters Patent, is—

1. In a bicycle a detachable hind wheel and supporting frame therefor in combination with a main frame provided with two points of attachment for the wheel supporting frame for general use and a third point of attachment between the other points for special use, as and for the purpose specified.

2. In a bicycle a detachable hind wheel provided with a supporting frame in combination with a main frame provided with a vertically arranged rear portion, and three points of attachment thereon for the hind wheel support, adapted for use as described, and substantially as set forth.

3. In a bicycle the combination of a main frame, a hind wheel provided with a supporting frame, a forked runner frame adapted to stride over the hind wheel and its supporting frame, and provided with forked bearings for said runners, with three points of attachment upon the main frame, for said wheel and runner supports, whereby the wheel support can be secured thereto singly or both parts aforesaid attached at once substantially as described.

4. In a bicycle the combination of a main frame provided with three points of attachment on its rear extension, a hind wheel and support therefor provided with two points of attachment registering with two points of attachment on the frame, a connecting link between two points of attachment on the wheel support and frame, substantially as described.

5. In a bicycle the combination of a main frame, provided, with an upwardly extending rear extension, a hind wheel and support therefor pivotally secured to said rear extension, and a doubly forked runner frame secured to the main frame at points above and below the said pivotal point provided with forked bearings for pivoted runners, substantially as described.

6. In a bicycle the combination of a main frame provided with two points of connection with a forked runner frame, a hind wheel support pivotally secured to the main frame between said points of attachment, detachable spur tire upon the hind wheel, and pivoted runners upon the front wheel and rear runner fork, substantially as described.

WILLIAM G. BOUSE.

Witnesses:
  WM. M. MONROE,
  ADOLPH GORGE.